May 8, 1956     J. V. WILLIFORD, JR     2,745,027
MAGNET CONVERSION OF AXIAL TO ROTARY MOTION
Filed Sept. 22, 1952

JACOB V. WILLIFORD, JR.
INVENTOR.

BY *Hazard + Miller*
ATTORNEYS.

United States Patent Office 2,745,027
Patented May 8, 1956

2,745,027

MAGNET CONVERSION OF AXIAL TO ROTARY MOTION

Jacob V. Williford, Jr., Downey, Calif., assignor, by mesne assignments, to Lido Land Co., Los Angeles, Calif., a copartnership Application September 22, 1952, Serial No. 310,847

3 Claims. (Cl. 310—103)

This invention has to do with a device for converting axial to rotary motion by the expedient of making use of a number of magnets.

The principle object of this invention is to provide a device having a number of magnets therein and thereon for converting axial motion to rotary motion by virtue of reciprocating a pair of hollow cylindrical bodies relative to each other or by axially reciprocating one body when the other body is held rigid.

Another object of this invention is to provide a device that will convert axial motion to rotary motion by utilizing the characteristics of a number of magnets when two bodies having the aforementioned magnets disposed therein and thereon are rotatably-reciprocated relative to each other.

A still further object of this invention is to provide a device, having the aforementioned characteristics, that will convert axial motion to a gradual or progressive rotary motion or by a sudden or "snap-action" motion.

A yet further object of this invention is to provide a device that will convert axial motion to rotary motion by the expedient above stated which has a rotary member or body that will tend to assume or will assume a central location despite any vibratory or torque action that may be applied thereto, in the absence of the device and bodies incorporated therein being reciprocated relative to each other or moved in any other manner included in the above foregoing objects.

Another object of this invention is to provide a device that will convert axial motion into rotary motion which has extremely few moving elements therein and which is economically and simply constructed.

With the foregoing and other objects in view, which will be made manifest in the following detailed description and specifically pointed out in the appended claims, reference is had to the accompanying drawings for an illustrative embodiment of the invention, wherein:

The device constituting this invention has virtually an infinite number of uses and can be applied in virtually an infinite number of industries. For example, this device may be incorporated in thermostat controls for furnaces and the like whereby the heat emanating from the furnace may be accurately and positively regulated; it may be used in a boiler feed water control system whereby the water in the boiler drums may be maintained at any suitable level that may be desired. Additionally this device may be incorporated on power tool machines for controlling the limit switches disposed thereon, such power tool machines being a lathe, a milling machine, grinders and the like. This device may also be incorporated in the average house or home for actuating the household switches therein or for actuating the thermostat of a furnace disposed within the home. These foregoing examples constitute merely a suggestion as to the applicability of this invention. It is not to be considered a limitation in any respect.

Figure 1:
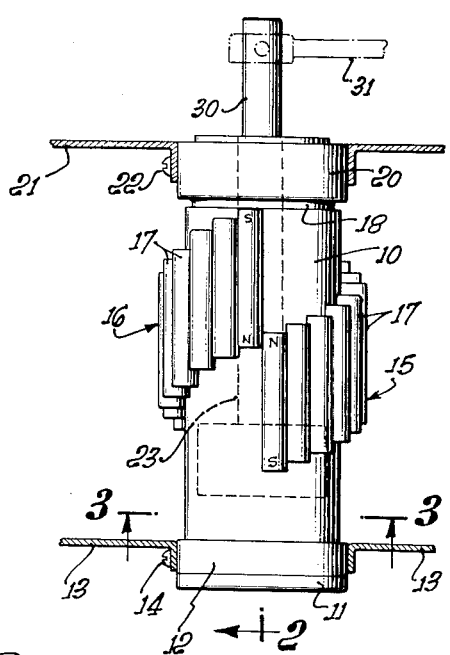
Figure 1 is a fragmentary perspective view illustrating the device of this invention.
Figure 2:
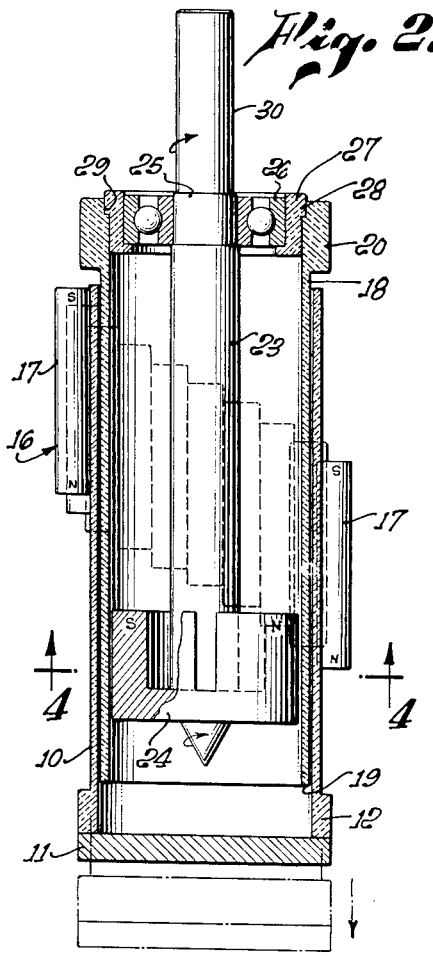
Fig. 2 is an enlarged fragmentary longitudinal cross sectional view taken on line 2—2 of Fig. 1.
Figure 3:
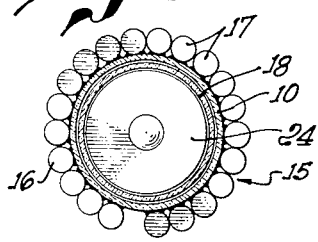
Fig. 3 is a transverse cross sectional view of the device taken on line 3—3 of Fig. 1.
Figure 4:
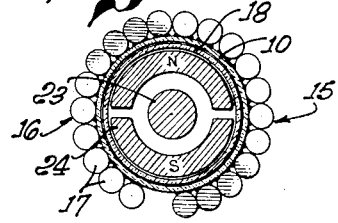
Fig. 4 is a transverse cross sectional view of the device taken on line 4—4 of Fig. 2.

Referring to the accompanying drawings wherein similar reference characters designate similar parts throughout, 10 indicates a hollow cylindrical non-magnet body having one end 11 closed; end 11 has an outwardly-extending annular shoulder 12 thereon, and secured to shoulder 12 are brackets 13. Brackets 13 may be secured in any conventional manner such as by screws 14 shown in Fig. 1 of the drawings. Disposed on the exterior surface of body 10 are two groups 15 and 16 of helically arranged bar magnets 17. It is to be noted, however, that these bar magnets may be electromagnets or horseshoe magnets and may be composed of any suitable magnetic material. Also, the helical arrangements of the magnets, as shown in Figs. 1 and 2 of the drawings, are not necessarily to be considered limitations but are illustrative only. This helical arrangement can have a greater helical or less helical degree of inclination than that shown. Additionally, the magnets may be of shorter length or of greater length and may extend and circumscribe the body a number of times from the open end of a body 10 to the closed end thereof. Body 10, as aforementioned, is composed of a non-magnetic material such as Bakelite, plastic, or both.

Telescopically disposed within body 10 is a second cylindrical non-magnetic body 18 having an open end 19 adjacent to closed end 11 of body 10. Body 18, like body 10, has an annular shoulder 20 in opposed relationship to shoulder 12 and has disposed thereon brackets 21 secured in a similar manner as brackets 13, i. e., by screws 22. Rotatably secured in body 18 is an elongated aluminum shaft 23 having a magnet 24 integral with the end of shaft 23 next adjacent the open end 19 of body 18. Shaft 23 has a reduced portion 25 and pressed on this reduced portion is a frictional ball bearing 26. Circumscribing bearing 26 is a non-magnetic plastic ring 27 which, in turn, is pressed into body 18 adjacent shoulder 20. Ring 27 has an annular shoulder 28 thereon which conforms to a recess 29 of body 18. By virtue of this construction relative to shaft 23, bearing 26 and ring 27, shaft 23 may be held in a rigid centrally located position relative to bodies 18 and 10. It will be noted that shaft 23 has an integral extension 30 that extends beyond the body 18. This extension has for its purpose the releasably securing thereto of an arm 31 that, in turn, will actuate any conventional switch, not shown.

In the construction of the invention as shown in Figs. 1 and 2 of the drawings, body 10 may be axially reciprocated relative to body 18.

In Fig. 2 of the drawings, the bar magnets 17 on body 10 are shown to have their south pole next adjacent to shoulder 20 with the north pole in opposed relationship to that of the said south pole. This construction has to do with one group 16. The other group 15 has the magnets in a reversed position, i. e., the south pole is next adjacent to shoulder 12 and the north pole is situated as the north pole of group 16. It is, of course, to be understood that this construction may be completely reversed and rotation of shaft 23 will still result. In other words, the magnets 17 of groups 15 and 16 have their exerted magnetic fields parallel to the axis of rotation of shaft 23. Obviously magnet 24 integral with shaft 23 has a north and south pole the same as magnets 17 of groups 15 and 17, but the magnetic field exerted by magnet 24 is transverse to the magnetic field of magnets 17 of groups 15 and 16.

The basic and generally understood concept that like forces repel, and unlike forces attract, is the natural law incorporated in this device in order to obtain the objects of this invention. In operation and by illustration only, body 10 may have its closed end 11 secured to any conventional type of linkage such as that of a float and may be caused to reciprocate axially relative to body 18 as indicated by the arrow shown in Fig. 2 of the drawings. This axial reciprocation will cause a magnetic disturbance to be created between magnets 17 of groups 15 and 16 and magnet 24 on shaft 23. As the magnets 17 are brought within close proximity to magnet 24, the shaft 23 will be caused to rotate due to the like forces repelling and unlike forces attracting. This resultant rotation, in turn, will cause arm 31 on extension 30 to actuate the switch secured thereto. This rotation is counterclockwise, due to the arrangement of the helical groups 15 and 16, as shown in Fig. 2. Return axial movement of body 10 to the solid line position shown in Fig. 2 will result in shaft 23 and magnet 24 rotating in a clockwise position and, in turn, actuating the aforementioned switch by arm 31. The magnets 17 of groups 15 and 16 are shown one next adjacent the other in a gradual stepping condition. However, it is to be noted that one, two or three of these magnets 17 may be eliminated and the rotary action of magnet 24 and shaft 23 may be snap or quick action. Additionally, a number of arms 31 may be secured releasably to extension 30 in order that a plurality of switches may be actuated thereby. The helical arrangement of magnets 17 may constitute a number of spirals about body 10 which would result in shaft 23 progressing through 360 or more degrees instead of the 180 degrees as illustrated.

Operation of the device illustrated in Figs. 1 to 4, inclusive, may be substantially reverse to that operation just previously described. For instance, shaft 23 may be rigidly held and body 18 axially reciprocated relative to body 10. In this operation body 10 and the magnets 17 thereon may be caused to rotate resulting in converting axial motion to rotary motion. The magnets 17 may be interconnected to a number of switches in any conventional manner or may be brought into contact with a number of switches and thereby the rotary motion would result in actuation of the said switches. In other words, the magnets 17 of groups 15 and 16 may be so disposed relative to ganged switches as to cause to be placed in operation a series of electrically interconnected mechanisms. Adding to or eliminating a portion of magnets 17 will enable actuating of a fewer or greater number of switches.

Figure 5:
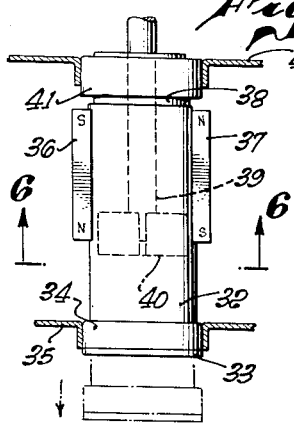
Fig. 5 is a fragmentary perspective view of a modified form of this invention.
Figure 6:
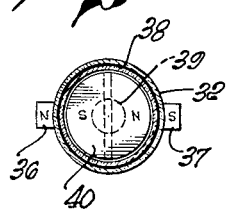
Fig. 6 is a transverse cross sectional view taken on lines 6—6 of Fig. 5.

In the modification illustrated in Figs. 5 and 6 of the drawings, 32 indicates a body similar to body 10 having a closed end 22, annular shoulders 34 and brackets 35 secured to shoulders 34, all similarly situated and constructed as that shown in Figs. 1 to 4, inclusive. However, body 32 has secured to the exterior surface thereof a pair of magnets 36 and 37 in opposed relationship thereto, the poles of one magnet being inverted as distinguished between the poles of the other magnet. Telescopically disposed within body 32 is a second cylindrical and hollow body 38 constructed of non-magnetic material similar to body 18 illustrated in Figs. 1 to 4, inclusive, of the drawings. Rotatably secured in body 38 by a construction similar to that shown in Fig. 4 of the drawings is a shaft 39 having a magnet 40 integral with one end thereof. Body 38, like body 18, has an annular shoulder 41 with brackets 42 secured thereto. Shaft 39, like shaft 23, may have an arm releasably secured thereto to actuate a single or a number of switches similar to that shown in Fig. 1 of the drawings.

In operation, the modification of the device as shown in Figs. 5 and 6 applies the same physical principle as the device shown in Figs. 1 to 4, inclusive. However, in this embodiment of the invention there are but a pair of opposed magnets instead of a plurality of helically arranged members. The device as illustrated in Figs. 5 and 6 may be interconnected to or come in contact relationship with such switches as household or other toggle or reciprocable types of construction. However, to insure that magnet 40 will describe the desired path to be taken, it is necessary to limit its movement by any conventional manner. This restricting movement or rotary motion of magnet 40 will result in inhibiting the rotation to substantially less than 180 degrees. As body 32 and the magnets disposed thereon are axially reicprocated relative to magnet 40 the latter will be repelled from a like force and be attracted by an unlike force which will cause a snapping or quick action.

The various operations of the device described relative to that shown in Figs. 1 to 4, inclusive, may be similarly applied to the modified form of the invention illustrated in Figs. 5 and 6. In other words, the shaft 39 and body 38 may be rigidly held from rotating and reciprocated relative to body 32, the latter being free to rotate. This operation, of course, would be applicable to actuate a number of switches electrically or mechanically interconnected or in contacting relationship with magnets 36 and 37. Also, bodies 32 and 38 may be reciprocably-rotated relative to each other in a manner similar to that previously described and for a similar purpose.

Various changes may be made in the details of construction without departing from the spirit and scope of the invention as defined by the appended claims.

I claim:

1. A device of the class described comprising two coaxially arranged members one of which is axially movable and the other of which is rotatable relatively thereto, a plurality of magnets on one of said members the axis of which are parallel to the axis of said member but the poles of which are distributed along the length of said member, the other member having a magnet the axis of which is arranged transverse to the axes of the first mentioned magnets whereby when relative axial movement occurs between said members rotary relative movement will be caused to take place between the members due to the change of repulsion and attraction between the magnets on said members.

2. A device of the class described comprising two coaxially arranged members one of which is axially movable and the other of which is rotatable relatively thereto, a plurality of magnets on one of said members the axes of which are parallel to the axis of said member but the poles of which are helically arranged about said member, the other member having a magnet the axis of which is arranged transverse to the axes of the first mentioned magnets whereby when relative axial movement occurs between said members rotary relative movement will be caused to take place between the members due to the change of repulsion and attraction between the magnets on said members.

3. A device of the class described comprising two coaxially arranged members one of which is axially movable and the other of which is rotatable relatively thereto, a plurality of magnets on one of said members the axes of which are parallel to the axis of said member but the poles of which are arranged upon two mutually opposed helices about said member, the other member having a magnet the axis of which is arranged transverse to the axes of the first mentioned magnets whereby when relative axial movement occurs between said members rotary relative movement will be caused to take place between the members due to the change of repulsion and attraction between the magnets on said members.

(References on following page)

References Cited in the file of this patent

UNITED STATES PATENTS

| | | |
|---|---|---|
| 1,788,065 | O'Neal | Jan. 6, 1931 |
| 2,102,409 | Faus | Dec. 14, 1937 |
| 2,371,511 | Faus | Mar. 13, 1945 |
| 2,536,824 | Sontheim | Jan. 2, 1951 |
| 2,561,116 | Hof | July 17, 1951 |
| 2,567,863 | Varga | Sept. 11, 1951 |
| 2,578,419 | Gittings | Dec. 11, 1951 |
| 2,585,714 | Wrobel et al. | Feb. 12, 1952 |